(12) United States Patent
Yu

(10) Patent No.: US 8,854,570 B2
(45) Date of Patent: Oct. 7, 2014

(54) LIGHT-EMITTING DEVICE FOR LIQUID CRYSTAL DISPLAY APPARATUS AND LIQUID CRYSTAL DISPLAY APPARATUS

(75) Inventor: Gang Yu, Shenzhen (CN)

(73) Assignee: Shenzhen China Star Optoelectronics Technology Co., Ltd., Guandong (CN)

( * ) Notice: Subject to any disclaimer, the term of this patent is extended or adjusted under 35 U.S.C. 154(b) by 248 days.

(21) Appl. No.: 13/318,780

(22) PCT Filed: Aug. 12, 2011

(86) PCT No.: PCT/CN2011/078315
§ 371 (c)(1),
(2), (4) Date: Nov. 4, 2011

(87) PCT Pub. No.: WO2013/007055
PCT Pub. Date: Jan. 17, 2013

(65) Prior Publication Data
US 2013/0016302 A1    Jan. 17, 2013

(30) Foreign Application Priority Data
Jul. 11, 2011  (CN) .................. 2011 2 0242814 U

(51) Int. Cl.
G02F 1/13357    (2006.01)
H05K 1/03       (2006.01)
F21V 8/00       (2006.01)
G02F 1/1335     (2006.01)

(52) U.S. Cl.
CPC ............ G02B 6/0085 (2013.01); G02B 6/0075 (2013.01); G02F 1/133615 (2013.01); G02B 6/0073 (2013.01); G02F 2001/133628 (2013.01)

USPC .............................................. 349/58; 349/62

(58) Field of Classification Search
CPC ........ G02B 6/00; G02F 1/13357; H05K 1/03; B32B 15/08; F21V 29/02; F21Y 101/02
USPC ...................................... 349/58, 62
See application file for complete search history.

(56) References Cited

U.S. PATENT DOCUMENTS

| | | | |
|---|---|---|---|
| 7,324,174 B2 * | 1/2008 | Hafuka et al. | 349/61 |
| 2006/0132699 A1 * | 6/2006 | Cho et al. | 349/161 |
| 2007/0019419 A1 * | 1/2007 | Hafuka et al. | 362/373 |
| 2008/0100790 A1 * | 5/2008 | Kang et al. | 349/161 |
| 2010/0073959 A1 * | 3/2010 | Hamada | 362/611 |
| 2010/0208491 A1 * | 8/2010 | Shin | 362/606 |
| 2011/0025942 A1 * | 2/2011 | Lee | 349/58 |
| 2011/0170034 A1 * | 7/2011 | Jeong | 349/61 |

(Continued)

FOREIGN PATENT DOCUMENTS

JP    2007042552 A  *  2/2007

Primary Examiner — Kaveh Kianni

(57) ABSTRACT

The present invention discloses a light-emitting device of a liquid crystal display apparatus, which includes a light bar and a frame. The frame has a surface having a fixing bar protruded therefrom. An extension direction of the fixing bar is parallel with the surface of the frame. A longer side of a main body of the light bar is attached to the fixing bar. Two ends of the fixing bar respectively have a heat-conductive portion mounted thereon. An inner surface of the heat-conductive portion is perpendicular to a length direction of the main body of the light bar and attached to a shorter side of the main body of the light bar. The present invention further discloses a liquid crystal display apparatus.

10 Claims, 2 Drawing Sheets

(56) References Cited

U.S. PATENT DOCUMENTS

| | | | |
|---|---|---|---|
| 2011/0170314 A1* | 7/2011 | Hsu et al. | 362/612 |
| 2011/0310331 A1* | 12/2011 | Heo et al. | 349/64 |
| 2012/0087110 A1* | 4/2012 | Lee | 362/97.3 |
| 2012/0274876 A1* | 11/2012 | Cappaert et al. | 349/62 |
| 2012/0293719 A1* | 11/2012 | Negoro | 348/725 |
| 2012/0314431 A1* | 12/2012 | Lin et al. | 362/382 |
| 2013/0027288 A1* | 1/2013 | Inoue et al. | 345/102 |
| 2013/0155723 A1* | 6/2013 | Coleman | 362/621 |

* cited by examiner

LIGHT-EMITTING DEVICE FOR LIQUID CRYSTAL DISPLAY APPARATUS AND LIQUID CRYSTAL DISPLAY APPARATUS

FIELD OF THE INVENTION

The present invention relates to a field of liquid crystal display technology, and more particularly to a light-emitting device for liquid crystal display apparatus and a liquid crystal display apparatus.

BACKGROUND OF THE INVENTION

As liquid crystal display apparatuses are continuously applied, users have more and more requirements for functions of the liquid crystal display apparatuses.

With reference to FIG. 1, FIG. 1 is a light-emitting structure of a liquid crystal structure in accordance with the prior art.

In the light-emitting structure shown in FIG. 1, a light bar 11 and a frame 12 are included, wherein the frame 12 has a fixing bar 121 protruded from a surface thereof, and a longer side of the light bar 11 is fixed onto the fixing bar 121. Heat generated by light-emitting diodes 111 on the light bar 11 is dissipated along a direction perpendicular to a light-emitting surface 112 thereof into the air, or into a main body of the light bar 11 and then conducted to the fixing bar 121 via the longer side of the light bar 11 so as to achieve heat dissipation, that is to say, the light bar 11 dissipates heat along a direction D1.

It has been found in practical measurement that a temperature variation along a length direction of the light bar 11 and a temperature variation along the direction D1 do not have differences in order of magnitude. Therefore the light bar 11 requires heat-dissipation in two-dimensional space along the direction D1 and the length direction of the light bar 11.

However the light-emitting structures in the conventional technology does not have a heat-dissipation channel along the length direction of the light bar 11, and only dissipates heat via the longer side of the light bar 11 that attached to the fixing bar 121 of the frame 12, and thereby extremely affects the heat-dissipation effect for the light-emitting structures.

Hence, how to overcome the problem of low heat-dissipation effect of the light-emitting structures in conventional technology caused by a light bar that is unable to perform effective heat-dissipation along a length direction of the light bar, is one of the technical problems to be solved in the field of liquid crystal display technology.

SUMMARY OF THE INVENTION

A first object of the invention is to provide a light-emitting device of a liquid crystal display apparatus to solve the technical problem of low heat-dissipation effect of a light-emitting structure in conventional technology caused by a light bar that is unable to perform effective heat-dissipation along a length direction of the light bar.

In order to solve the foregoing problem, the present invention provides a light-emitting device having a light bar and a frame, wherein a fixing bar is protruded from a surface of a main body of the frame, and an extension direction of the fixing bar is parallel with the surface of the main body of the frame; a longer side of a main body of the light bar is attached to the fixing bar, and a length direction of the light bar is parallel with the extension direction of the fixing bar; the light bar has a plurality of light-emitting diodes, and the light-emitting diodes are arranged averagely on the main body of the light bar;

each of two ends of the fixing bar has a heat-conductive portion mounted thereon, and an inner surface of the heat-conductive portion is perpendicular to the length direction of the main body of the light bar and attached to a shorter side of the main body of the light bar;

the heat-conductive portion is integrally and transversely protruded from each of the two ends of the fixing bar.

In the light-emitting device of the liquid crystal display apparatus of the present invention, the device further comprises a backboard, and the frame is mounted on the backboard.

A second object of the invention is to provide a light-emitting device of a liquid crystal display apparatus to solve the technical problem of low heat-dissipation effect of a light-emitting structure in conventional technology caused by a light bar that is unable to perform effective heat-dissipation along a length direction of the light bar.

In order to solve the foregoing problem, the present invention provides a light-emitting device having a light bar and a frame, wherein a fixing bar is protruded from a surface of a main body of the frame, and an extension direction of the fixing bar is parallel with the surface of the main body of the frame; a longer side of a main body of the light bar is attached to the fixing bar, and a length direction of the light bar is parallel with the extension direction of the fixing bar;

each of two ends of the fixing bar has a heat-conductive portion mounted thereon, and an inner surface of the heat-conductive portion is perpendicular to the length direction of the main body of the light bar and attached to a shorter side of the main body of the light bar.

In the light-emitting device of the liquid crystal display apparatus of the present invention, the device further comprises a backboard, and the frame is mounted on the backboard.

In the light-emitting device of the liquid crystal display apparatus of the present invention, the light bar has a plurality of light-emitting diodes, and the light-emitting diodes are arranged averagely on the main body of the light bar.

In the light-emitting device of the liquid crystal display apparatus of the present invention, the heat-conductive portion is integrally and transversely protruded from each of the two ends of the fixing bar.

In the light-emitting device of the liquid crystal display apparatus of the present invention, the heat-conductive portion is an independent heat-conductive sheet, and the heat-conductive sheet is attached to the shorter side of the main body of the light bar and the frame by adhesion.

A third object of the invention is to provide a liquid crystal display apparatus to solve the technical problem of low heat-dissipation effect of a light-emitting structure in conventional technology caused by a light bar that is unable to perform effective heat-dissipation along a length direction of the light bar.

In order to solve the foregoing problem, the present invention provides a liquid crystal display apparatus having a liquid crystal panel and a light-emitting device, and the light-emitting device is mounted on a side of the liquid crystal panel and includes a light bar and a frame, wherein a fixing bar is protruded from a surface of a main body of the frame, and an extension direction of the fixing bar is parallel with the surface of the main body of the frame; a longer side of a main body of the light bar is attached to the fixing bar, and a length direction of the light bar is parallel with the extension direction of the fixing bar;

each of two ends of the fixing bar has a heat-conductive portion mounted thereon, and an inner surface of the heat-conductive portion is perpendicular to the length direction of the main body of the light bar and attached to a shorter side of the main body of the light bar.

In the liquid crystal display apparatus of the present invention, the light-emitting device further comprises a backboard, and the frame is mounted on the backboard.

In the liquid crystal display apparatus of the present invention, the light bar has a plurality of light-emitting diodes, and the light-emitting diodes are arranged averagely on the main body of the light bar.

In the liquid crystal display apparatus of the present invention, the heat-conductive portion is integrally and transversely protruded from each of the two ends of the fixing bar.

In the liquid crystal display apparatus of the present invention, the heat-conductive portion is an independent heat-conductive sheet, and the heat-conductive sheet is attached to the shorter side of the main body of the light bar and the frame by adhesion.

Compared with the conventional technology, the present invention solves the problem of low heat-dissipation effect of a light-emitting structure in conventional technology caused by a light bar that is unable to perform effective heat-dissipation along a length direction of the light bar, and accomplishes the heat-dissipation of the light bar in two-dimensional space.

In order to make the contents of the present invention to be easily understood, the preferred embodiments of the present invention are described in detail in cooperation with accompanying drawings as follows:

DETAILED DESCRIPTION OF THE PREFERRED EMBODIMENTS

Following description of each embodiment is referring to the accompanying drawings so as to illustrate practicable specific embodiments in accordance with the present invention.

Figure 1:
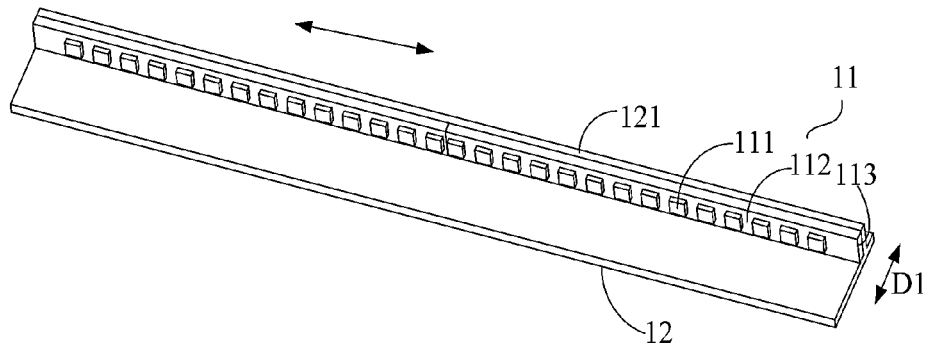
FIG. 1 is a light-emitting structure of a liquid crystal device in accordance with the prior art.
Figure 2:
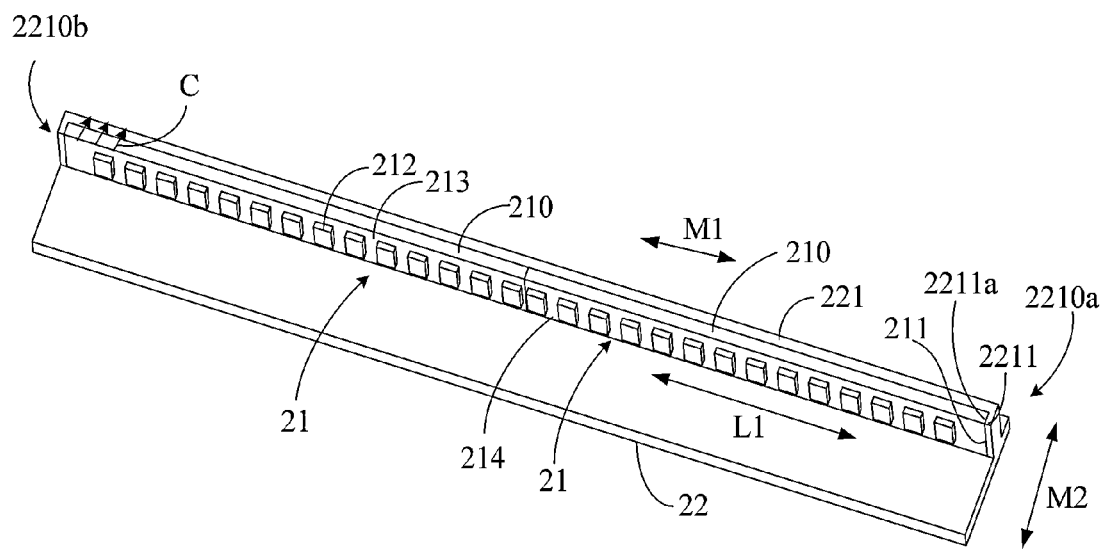
FIG. 2 is a schematic structural view of a first preferred embodiment of a light-emitting structure of a liquid crystal display apparatus in accordance with the present invention.

With reference to FIG. 2, FIG. 2 is a schematic structural view of a first preferred embodiment of a light-emitting structure of a liquid crystal display apparatus in accordance with the present invention.

In the light-emitting device of the liquid crystal display apparatus shown in FIG. 2, the device comprises a light bar 21 and a frame 22. A fixing bar 221 is protruded from a surface of a main body of the frame 22, The fixing bar 221 extends along an extension direction M1. The extension direction M1 is parallel with the surface of the main body of the frame 22. A longer side 214 of a main body 210 of the light bar 21 is attached to the fixing bar 221. A length direction (marked with "L1" in FIGS. 2 and 3) of the main body 210 of the light bar 21 is parallel with the extension direction M1 of the fixing bar 221.

In the embodiment shown in FIG. 2, each of two ends (2210a, 2210b) of the fixing bar 221 has a heat-conductive portion 2211 mounted thereon. An inner surface 2211a of the heat-conductive portion 2211 is attached to a shorter side 211 of the main body 210 of the light bar 21. Meanwhile, the heat-conductive portion 2211 is perpendicular to the length direction L1 of the main body 210 of the light bar 21.

In the embodiment shown in FIG. 2, the heat-conductive portion 2211 is integrally and transversely protruded from each of the two ends (2210a, 2210b) of the fixing bar 221.

In the embodiment shown in FIG. 2, the light bar 21 has a plurality of light-emitting diodes 212, and the light-emitting diodes 212 are averagely arranged on the main body of the light bar 21. The light bar 21 further has a light-emitting surface 213.

In this embodiment, the device further has a backboard (not shown in the drawings), the frame 22 is mounted on the backboard.

The operation theory of the light-emitting device of the liquid crystal display apparatus shown in FIG. 2 is described as follows:

The light-emitting diodes 212 generates heat during work, a part of the heat is dissipated into the air along a direction perpendicular to the light-emitting surface 213; another part is guided into the main body of the light bar 21 and then transferred to the fixing bar 221 via the longer side of the light bar 21 and then further transferred to the frame 21 to perform dissipation, that is to say, a part of the heat of the light-emitting diodes 212 is dissipated along a direction M2; still another part of the heat is transferred to the heat-conductive portion 2211 of the fixing bar 221 via the shorter side 211 along the length direction of the light bar 21, and further transferred to the frame 21, and the frame 21 then transfers the heat to the backboard to perform heat-dissipation, that is to say, another part of the heat of the light-emitting diodes 212 is dissipated along the direction M1.

Apparently, this embodiment is able to not only use a path perpendicular to the light-emitting surface 213 as a heat-dissipation channel (marked with "C" in FIGS. 2 and 3) to dissipate heat, but also dissipates heat along the length direction of the light bar 21, and thereby accomplishes heat-dissipation in two-dimensional space, and greatly ensures the heat-dissipation effect.

The present invention further provides a liquid crystal display apparatus. The liquid crystal display apparatus includes a liquid crystal panel and a light-emitting device shown in FIG. 2. The light-emitting device is mounted at a side of the liquid crystal panel. The device has been described in detail in the foregoing description, and no more tautology here.

Figure 3:
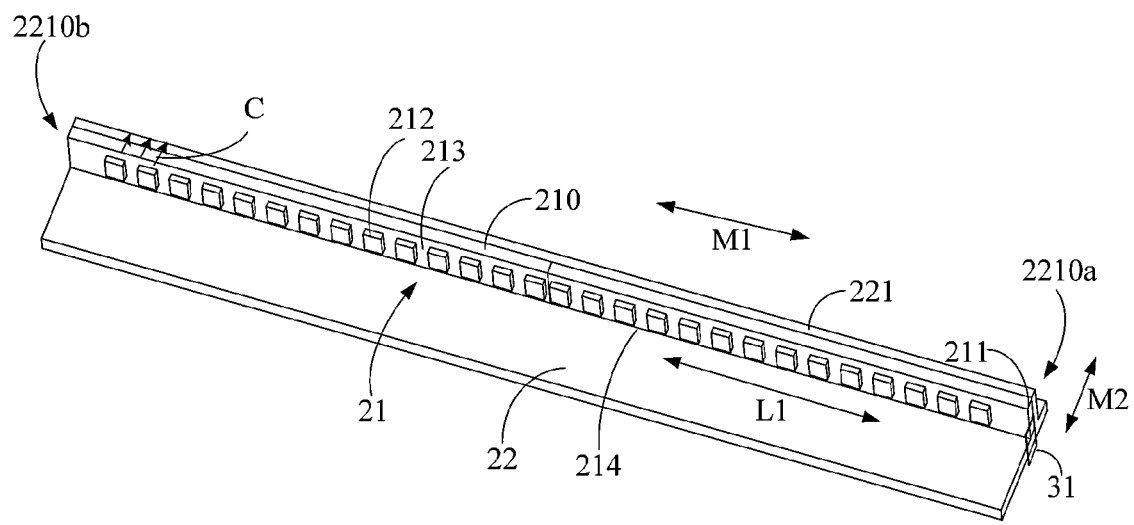
FIG. 3 is a schematic structural view of a second preferred embodiment of a light-emitting structure of a liquid crystal display apparatus in accordance with the present invention.

With reference to FIG. 3, FIG. 3 is a schematic structural view of a second preferred embodiment of a light-emitting structure of a liquid crystal display apparatus in accordance with the present invention.

In the embodiment shown in FIG. 3, the difference to the embodiment shown in FIG. 2 is that: shorter sides 211 of the light bar 21 are respectively connected to a heat-conductive sheet 31. Wherein, the shorter sides of the light bar 21 are two ends of the light bar 21 along the length direction of the light bar 21. The heat-conductive portion is an independent heat-conductive sheet 31, and the heat-conductive sheet 31 is attached to the shorter side of the main body of the light bar 21 and the frame 22 by adhesion.

The heat-conductive sheet 31 may also be connected to the shorter side 211 of the light bar 21 and the frame 22 using other methods, such as soldering.

In this embodiment, the device further has a backboard (not shown in the drawings), the frame 22 is mounted on the backboard.

In the embodiment shown in FIG. 3, the light bar 21 has a plurality of light-emitting diodes 212, and the light-emitting diodes 212 are averagely arranged on the main body of the light bar 21. The light bar 21 further has a light-emitting surface 213.

The operation theory of the light-emitting device of the liquid crystal display apparatus shown in FIG. 3 is described as follows:

The light-emitting diodes 212 generates heat during work, a part of the heat is dissipated into the air along a direction perpendicular to the light-emitting surface 213; another part is guided into the main body of the light bar 21 and then transferred to the fixing bar 221 via the longer side of the light bar 21 and then further transferred to the frame 21 to perform dissipation, that is to say, a part of the heat of the light-emitting diodes 212 is dissipated along a direction M2; still another part of the heat is transferred to the heat-conductive sheet 31 via the shorter side 211 along the length direction of the light bar 21, the heat is further transferred to the frame 21 via the heat-conductive sheet 31, and the frame 21 then transfers the heat to the backboard to perform heat-dissipation.

Apparently, the embodiment shown in FIG. 3 can not only ensure the light bar 21 use a path perpendicular to the light-emitting surface 213 as a heat-dissipation channel to perform heat-dissipation, but also performs heat-dissipation along the length direction of the light bar 21, and thereby accomplishes heat-dissipation in two-dimensional space, and greatly ensures the heat-dissipation effect.

The present invention further provides a liquid crystal display apparatus. The liquid crystal display apparatus includes a liquid crystal panel and a light-emitting device shown in FIG. 3. The light-emitting device is mounted at a side of the liquid crystal panel. The device has been described in detail in the foregoing description, and no more tautology here.

In conclusion, although the present invention has been described with reference to embodiments thereof, these embodiments merely illustrate concrete examples, not restrict the present invention. And it is understood that many changes and modifications to the described embodiment can be carried out without departing from the scope and the spirit of the invention that is intended to be limited only by the appended claims.

What is claimed is:

1. A light-emitting device of a liquid crystal display apparatus, comprising a light bar and a frame, wherein a fixing bar is protruded from a surface of a main body of the frame, and an extension direction of the fixing bar is parallel with the surface of the main body of the frame; a longer side of a main body of the light bar is attached to the fixing bar, and a length direction of the light bar is parallel with the extension direction of the fixing bar; the light bar has a plurality of light-emitting diodes, and the light-emitting diodes are arranged averagely on the main body of the light bar;

each of two ends of the fixing bar has a heat-conductive portion mounted thereon, and an inner surface of the heat-conductive portion is perpendicular to the length direction of the main body of the light bar and attached to a shorter side of the main body of the light bar;

the heat-conductive portion is integrally and transversely protruded from each of the two ends of the fixing bar.

2. The light-emitting device of the liquid crystal display apparatus as claimed in claim 1, characterized in that: the device further comprises a backboard, and the frame is mounted on the backboard.

3. A light-emitting device of a liquid crystal display apparatus, comprising a light bar and a frame, wherein a fixing bar is protruded from a surface of a main body of the frame, and an extension direction of the fixing bar is parallel with the surface of the main body of the frame; a longer side of a main body of the light bar is attached to the fixing bar, and a length direction of the light bar is parallel with the extension direction of the fixing bar, characterized in that:

each of two ends of the fixing bar has a heat-conductive portion mounted thereon, and an inner surface of the heat-conductive portion is perpendicular to the length direction of the main body of the light bar and attached to a shorter side of the main body of the light bar, wherein the heat-conductive portion is integrally and transversely protruded from each of the two ends of the fixing bar.

4. The light-emitting device of the liquid crystal display apparatus as claimed in claim 3, characterized in that: the device further comprises a backboard, and the frame is mounted on the backboard.

5. The light-emitting device of the liquid crystal display apparatus as claimed in claim 3, characterized in that: the light bar has a plurality of light-emitting diodes, and the light-emitting diodes are arranged averagely on the main body of the light bar.

6. The light-emitting device of the liquid crystal display apparatus as claimed in claim 3, characterized in that: the heat-conductive portion is an independent heat-conductive sheet, and the heat-conductive sheet is attached to the shorter side of the main body of the light bar and the frame by adhesion.

7. A liquid crystal display apparatus, comprising a liquid crystal panel and a light-emitting device, and the light-emitting device is mounted at a side of the liquid crystal panel and includes a light bar and a frame, wherein a fixing bar is protruded from a surface of a main body of the frame, and an extension direction of the fixing bar is parallel with the surface of the main body of the frame; a longer side of a main body of the light bar is attached to the fixing bar, and a length direction of the light bar is parallel with the extension direction of the fixing bar, characterized in that:

each of two ends of the fixing bar has a heat-conductive portion mounted thereon, and an inner surface of the heat-conductive portion is perpendicular to the length direction of the main body of the light bar and attached to a shorter side of the main body of the light bar, wherein the heat-conductive portion is integrally and transversely protruded from each of the two ends of the fixing bar.

8. The liquid crystal display apparatus as claimed in claim 7, characterized in that: the light-emitting device further comprises a backboard, and the frame is mounted on the backboard.

9. The liquid crystal display apparatus as claimed in claim 7, characterized in that: the light bar has a plurality of light-emitting diodes, and the light-emitting diodes are arranged averagely on the main body of the light bar.

10. The liquid crystal display apparatus as claimed in claim 7, characterized in that: the heat-conductive portion is an independent heat-conductive sheet, and the heat-conductive sheet is attached to the shorter side of the main body of the light bar and the frame by adhesion.

* * * * *